(12) United States Patent
Jang

(10) Patent No.: US 10,990,354 B2
(45) Date of Patent: Apr. 27, 2021

(54) NEURAL NETWORK ACCELERATING DEVICE AND METHOD OF CONTROLLING THE SAME

(71) Applicant: SK hynix Inc., Icheon (KR)

(72) Inventor: Jae Hyeok Jang, Icheon (KR)

(73) Assignee: SK hynix Inc., Icheon (KR)

( * ) Notice: Subject to any disclaimer, the term of this patent is extended or adjusted under 35 U.S.C. 154(b) by 56 days.

(21) Appl. No.: 16/569,516

(22) Filed: Sep. 12, 2019

(65) Prior Publication Data

US 2020/0301665 A1    Sep. 24, 2020

(30) Foreign Application Priority Data

Mar. 20, 2019    (KR) ........................ 10-2019-0031611

(51) Int. Cl.
*G06F 7/544*    (2006.01)
*G06F 7/46*    (2006.01)

(52) U.S. Cl.
CPC .............. *G06F 7/462* (2013.01); *G06F 7/461* (2013.01); *G06F 7/5443* (2013.01)

(58) Field of Classification Search
CPC ................................ G06F 7/5443; G06F 17/16
See application file for complete search history.

(56) References Cited

U.S. PATENT DOCUMENTS

| 2015/0095394 | A1* | 4/2015 | Finchelstein ......... G06F 7/5443 708/523 |
| 2016/0358069 | A1* | 12/2016 | Brothers ................. G06F 7/764 |
| 2018/0164866 | A1* | 6/2018 | Turakhia ................ G06N 3/063 |
| 2018/0218518 | A1* | 8/2018 | Yan ......................... G06N 3/063 |

FOREIGN PATENT DOCUMENTS

KR    20170080087 A    7/2017

OTHER PUBLICATIONS

Chen et al., Eyeriss: An Energy-Efficient Reconfigurable Accelerator for Deep Convolutional Neural Networks, IEEE Journal of Solid-State Circuits, Jan. 2017, pp. 127-138, vol. 52, No. 1.

* cited by examiner

*Primary Examiner* — Chuong D Ngo

(57) ABSTRACT

An accelerating device includes a signal detector that converts a first input signal and a second input signal into a first converted input signal and a second converted input signal, respectively, and that generates a final zero-value flag signal, a first one-value flag signal, and a second one-value flag signal. The accelerating device further includes a processing element (PE) that processes the first converted input signal and the second converted input signal based on the final zero-value flag signal, the first one-value flag signal, and the second one-value flag signal and that skips a first arithmetic operation and a second arithmetic operation when the final zero-value flag signal has a first value. The first value of the final zero-value flag signal indicates that the first input signal, or the second input signal, or both have a value of 0.

20 Claims, 10 Drawing Sheets

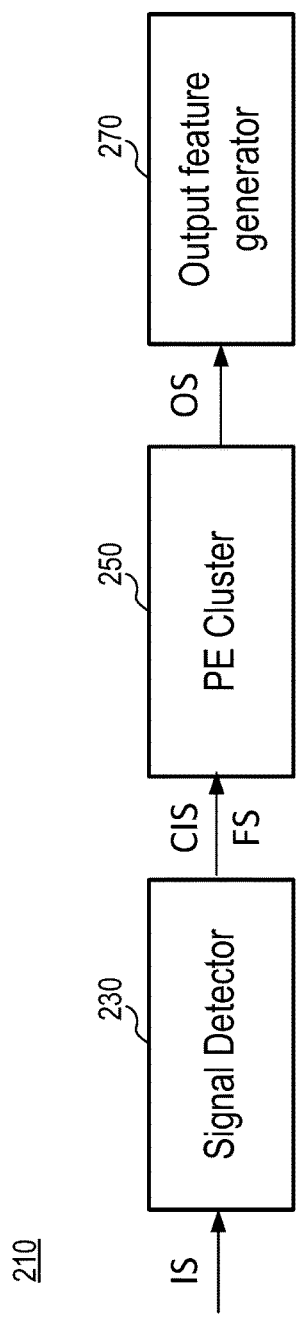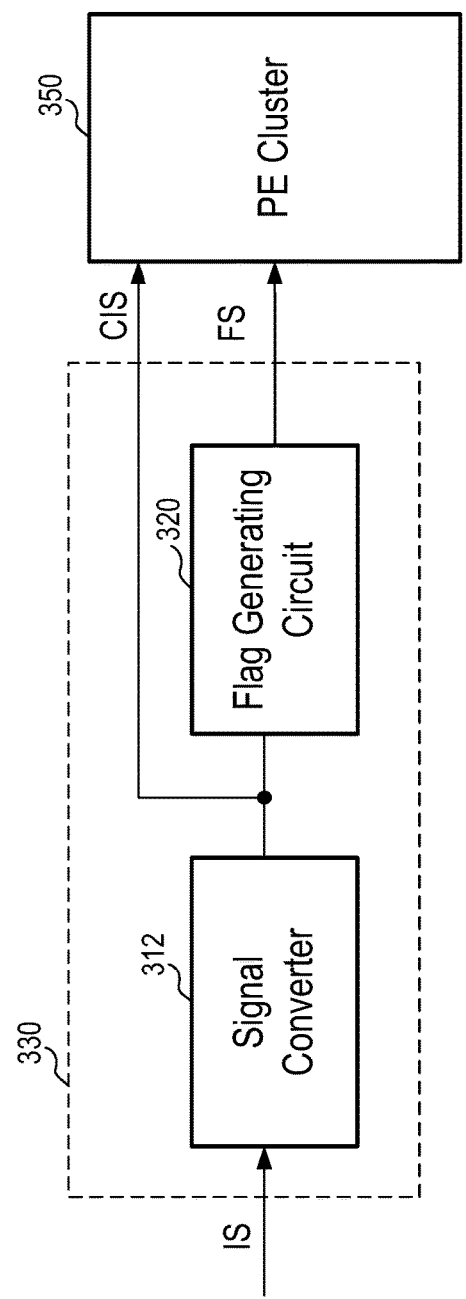

FIG. 8

| Feature | Weight | cf | cw | zff | zfw | zf | off | ofw | Mem read | c0 ff0 | c0 ff1 | c1 | c2 ff2 | PE Operation |
|---|---|---|---|---|---|---|---|---|---|---|---|---|---|
| -1 | -1 | 1 | 1 | 0 | 0 | 0 | 1 | 1 | Partially skip mem read | 0 | 0 | 0 (cf) | 1 | One-value skip |
| 0 | -1 | 0 | -1 | 1 | 0 | 1 | 0 | 0 | Skip entire mem read | 0 | 0 | 1 (Mult result) | 0 | Zero-value skip |
| 1 | -1 | -1 | 1 | 0 | 0 | 0 | 0 | 1 | Partially skip mem read | 0 | 0 | 0 (cf) | 1 | One-value skip |
| Integer | -1 | -(integer) | 1 | 0 | 0 | 0 | 0 | 1 | Partially skip mem read | 0 | 0 | 0 (cf) | 1 | One-value skip |
| -(integer) | -1 | Integer | 1 | 0 | 0 | 1 | 0 | 1 | Partially skip mem read | 0 | 0 | 0 (cf) | 1 | One-value skip |
| -1 | 0 | -1 | 0 | 0 | 1 | 1 | 1 | 0 | Skip entire mem read | 0 | 0 | 1 (Mult result) | 0 | Zero-value skip |
| 0 | 0 | 0 | 0 | 1 | 1 | 1 | 0 | 0 | Skip entire mem read | 0 | 0 | 1 (Mult result) | 0 | Zero-value skip |
| 1 | 0 | 1 | 0 | 0 | 1 | 1 | 1 | 0 | Skip entire mem read | 0 | 0 | 1 (Mult result) | 0 | Zero-value skip |
| Integer | 0 | Integer | 0 | 0 | 1 | 1 | 0 | 0 | Skip entire mem read | 0 | 0 | 1 (Mult result) | 0 | Zero-value skip |
| -(integer) | 0 | -(integer) | 0 | 0 | 1 | 1 | 1 | 0 | Skip entire mem read | 0 | 0 | 1 (Mult result) | 0 | Zero-value skip |
| -1 | 1 | -1 | 1 | 0 | 0 | 0 | 1 | 1 | Partially skip mem read | 0 | 0 | 0 (cf) | 1 | One-value skip |
| 0 | 1 | 0 | 1 | 1 | 0 | 1 | 0 | 1 | Partially skip mem read | 0 | 0 | 1 (Mult result) | 0 | Zero-value skip |
| 1 | 1 | 1 | 1 | 0 | 0 | 0 | 0 | 1 | Partially skip mem read | 0 | 0 | 0 (cf) | 1 | One-value skip |
| Integer | 1 | Integer | 1 | 0 | 0 | 0 | 0 | 1 | Partially skip mem read | 0 | 0 | 0 (cf) | 1 | One-value skip |
| -(integer) | 1 | -(integer) | 1 | 0 | 0 | 0 | 1 | 1 | Partially skip mem read | 0 | 0 | 2 (cw) | 1 | One-value skip |
| -1 | Integer | -1 | -(integer) | 1 | 0 | 0 | 1 | 0 | Skip entire mem read | 0 | 0 | 1 (Mult result) | 0 | Zero-value skip |
| 0 | Integer | 0 | Integer | 1 | 0 | 1 | 0 | 0 | Skip entire mem read | 0 | 0 | 1 (Mult result) | 0 | Zero-value skip |
| 1 | Integer | 1 | Integer | 0 | 0 | 0 | 0 | 0 | Partially skip mem read | 0 | 0 | 1 (Mult result) | 1 | One-value skip |
| Integer | Integer | Integer | Integer | 0 | 0 | 0 | 0 | 0 | Read entire memories | 1 | 1 | 1 (Mult result) | 1 | Normal |
| -(integer) | Integer | -(integer) | Integer | 0 | 0 | 0 | 1 | 0 | Read entire memories | 1 | 1 | 1 (Mult result) | 1 | Normal |
| -1 | -(integer) | 1 | Integer | 0 | 0 | 0 | 1 | 1 | Partially skip mem read | 0 | 0 | 2 (cw) | 1 | One-value skip |
| 0 | -(integer) | 0 | -(integer) | 1 | 0 | 1 | 0 | 0 | Skip entire mem read | 0 | 0 | 1 (Mult result) | 0 | Zero-value skip |
| 1 | -(integer) | -1 | -(integer) | 0 | 0 | 0 | 0 | 1 | Partially skip mem read | 0 | 0 | 2 (cw) | 1 | One-value skip |
| Integer | -(integer) | Integer | -(integer) | 0 | 0 | 0 | 0 | 0 | Read entire memories | 1 | 1 | 1 (Mult result) | 1 | Normal |
| -(integer) | -(integer) | -(integer) | -(integer) | 0 | 0 | 0 | 0 | 0 | Read entire memories | 1 | 1 | 1 (Mult result) | 1 | Normal |

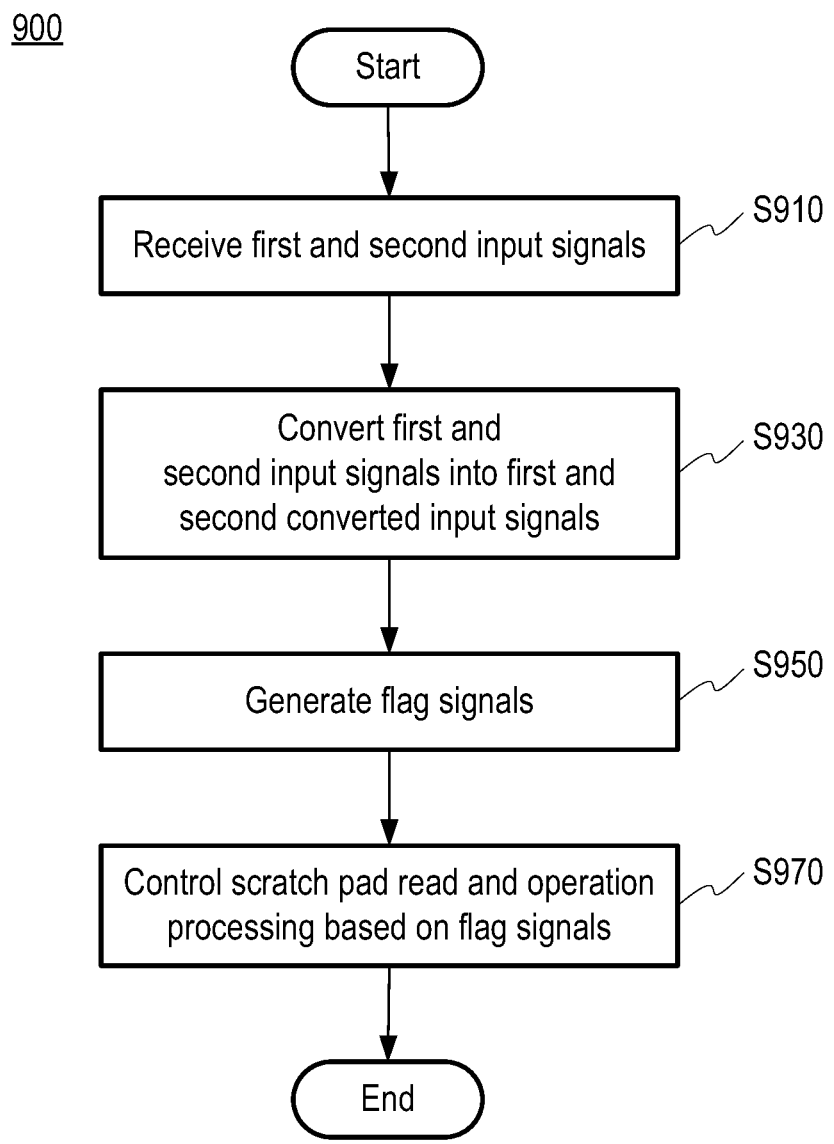

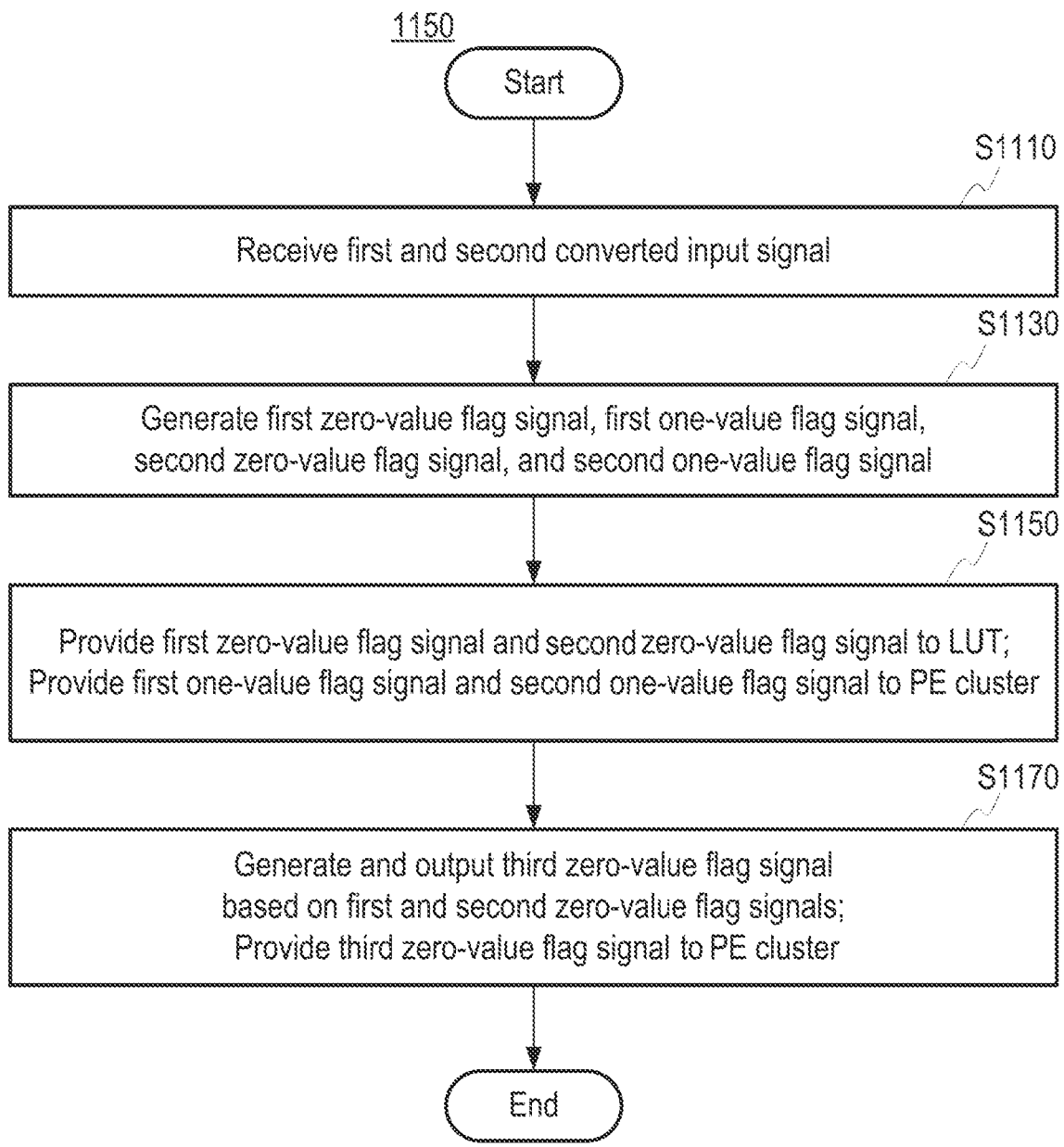

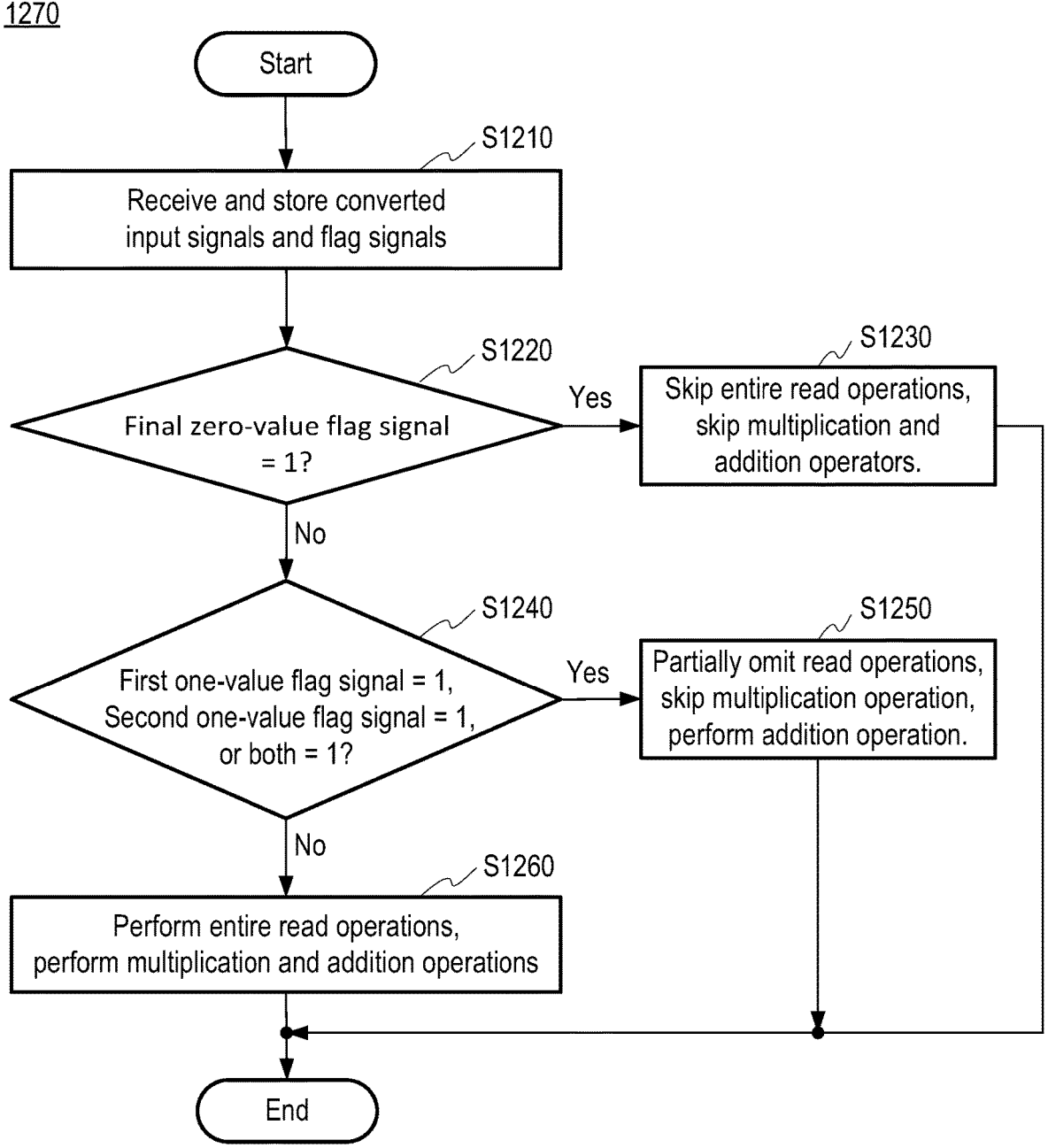

NEURAL NETWORK ACCELERATING DEVICE AND METHOD OF CONTROLLING THE SAME

CROSS-REFERENCE TO RELATED APPLICATION

The present application claims priority under 35 U.S.C. § 119(a) to Korean patent application number 10-2019-0031611, filed in the Korean Intellectual Property Office on Mar. 20, 2019, which is incorporated herein by reference in its entirety.

BACKGROUND

The present disclosure relates to an accelerating device and a processing system including the accelerating device, and a method of controlling the accelerating device. In particular, some embodiments relate to a neural network accelerating device.

Various Artificial Neural Networks (ANNs) are effective tools for performing artificial intelligence (AI) tasks. For example, deep neural networks (DNNs) are used for AI tasks including computer vision, object and speech recognition, medical diagnosis, game play, and robotics. The DNNs include a convolutional neural network (CNN) having a plurality of convolutional layers, each of which generates a successively higher-level abstraction of input data. The DNNs also include a binarized neural network (BNN) having binary weights.

A neural network accelerating device (NNAD) is a microprocessor or a computer system designed for performing a specific AI task. For example, the NNAD may include a plurality of processing elements (PEs) that perform multiply-and-accumulate (MAC) operations in parallel. Each of MAC operations requires a plurality of read operations from a memory (e.g., an off-chip DRAM) and a plurality of arithmetic operations, which may increase power consumption and reduce a data processing speed.

SUMMARY

Embodiments of the present application relate to an accelerating device and a processing system including the accelerating device, and a method of controlling the accelerating device.

In an embodiment, an accelerating device includes a signal detector that converts a first input signal and a second input signal into a first converted input signal and a second converted input signal, respectively, and that generates a final zero-value flag signal, a first one-value flag signal, and a second one-value flag signal. The accelerating device further includes a processing element (PE) that processes the first converted input signal and the second converted input signal based on the final zero-value flag signal, the first one-value flag signal, and the second one-value flag signal and that skips a first arithmetic operation and a second arithmetic operation when the final zero-value flag signal has a first value. The first value of the final zero-value flag signal indicates that the first input signal, or the second input signal, or both have a value of 0.

In an embodiment, a processing system includes a memory configured to store data and output input signals in response to a request signal from a host and an accelerating device that receives the input signals and performs one or more given arithmetic operations on the input signals. The input signals include a first input signal and a second input signal. The accelerating device includes a signal detector that converts the first input signal and the second input signal into a first converted input signal and a second converted input signal, respectively, and that generates a final zero-value flag signal, a first one-value flag signal, and a second one-value flag signal. The accelerating device further includes a processing element (PE) that processes the first converted input signal and the second converted input signal based on the final zero-value flag signal, the first one-value flag signal, and the second one-value flag signal and that skips a first arithmetic operation and a second arithmetic operation when the final zero-value flag signal has a first value. The first value of the final zero-value flag signal indicates that the first input signal, or the second input signal, or both have a value of 0.

In an embodiment, a method for controlling an accelerating device includes converting a first input signal and a second input signal into a first converted input signal and a second converted input signal, respectively, generating a final zero-value flag signal, a first one-value flag signal, and a second one-value flag signal, and skipping a first arithmetic operation and a second arithmetic operation when the final zero-value flag signal has a first value. The first value of the final zero-value flag signal indicates that the first input signal, or the second input signal, or both have a value of 0.

BRIEF DESCRIPTION OF THE DRAWINGS

FIG. 2 illustrates a neural network accelerating device (NNAD) according to an embodiment of the present disclosure.

FIG. 3 illustrates a signal detector and a PE cluster according to an embodiment of the present disclosure.

FIG. 8 values of a first input signal, a second input signal, a first converted input signal, a second converted input signal, a first zero-value flag signal, a second zero-value flag signal, a final zero-value signal, a first one-value flag signal, and a second one-value flag signal, a first control signal, a second control signal, and a third control signal, according to an embodiment.

FIG. 9 is a flowchart illustrating a process performed by a neural network accelerating device according to an embodiment.

FIG. 11 is a flowchart illustrating a process of generating one or more flag signals according to an embodiment.

FIG. 12 is a flowchart illustrating a process of controlling one or more read operations on a first internal memory and one or more operations of an operation unit, according to an embodiment.

DETAILED DESCRIPTION

Figure 1:
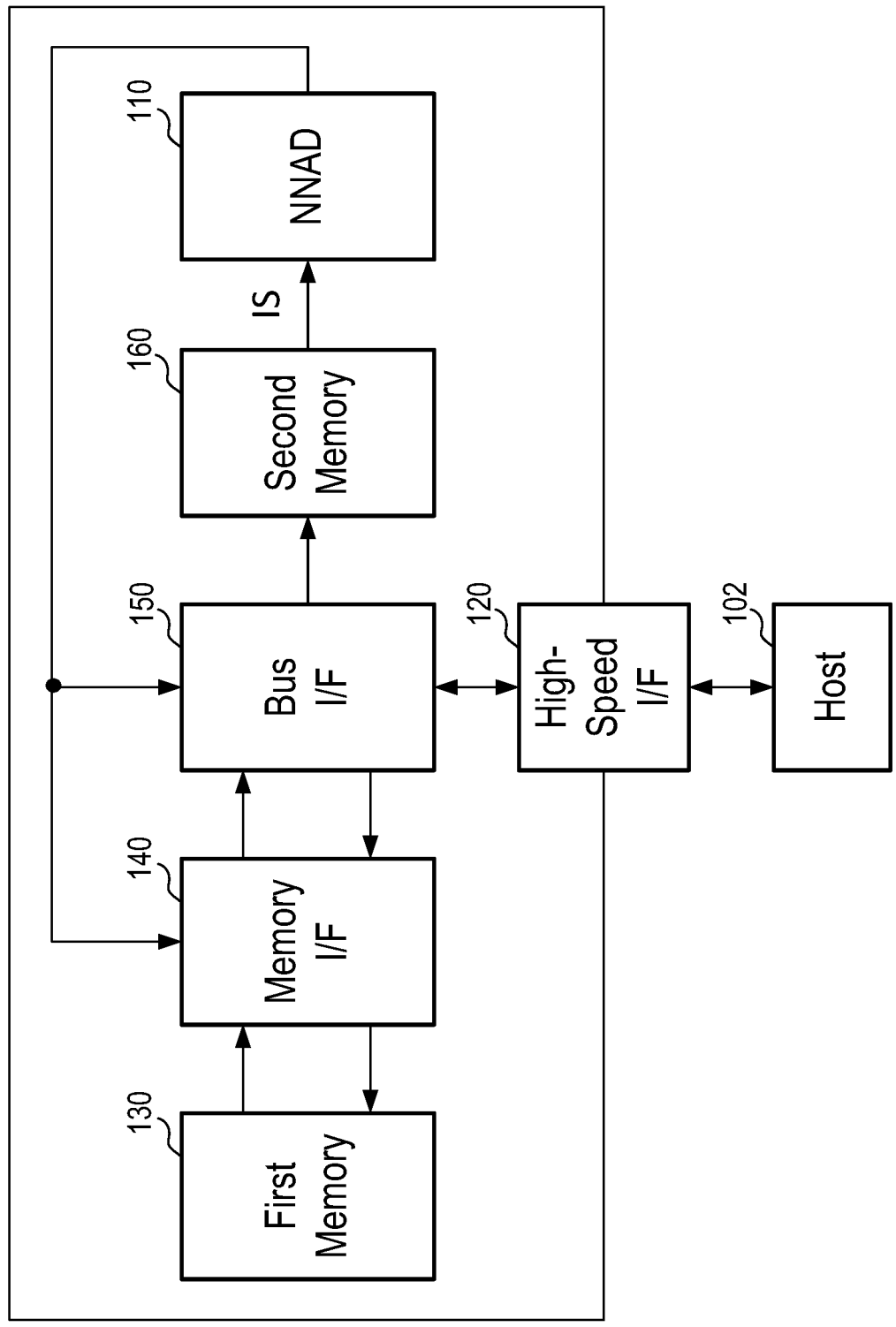
FIG. 1 illustrates a processing system and a host according to an embodiment of the present disclosure.

Embodiments of the present application relate to an accelerating device and a processing system including the accelerating device, and a method of controlling the accelerating device. The accelerating device includes a processing element (PE) that skips a first arithmetic operation and a second arithmetic operation when a final zero-value flag signal has a first value. The PE further skips the first arithmetic operation and performs the second arithmetic operation when a first one-value flag signal, or a second one-value flag signal, or both have the first value, and the final zero-value flag signal has a second value. By skipping the first arithmetic operation and the second arithmetic operation, or the first arithmetic operation, an occurrence of one or more dynamic currents in an operation unit of the PE is substantially prevented, thereby reducing power consumption of the operation unit.

In an embodiment, the accelerating device further includes a signal detector configured to convert a first input signal and a second input signal into a first converted input signal and a second converted input signal, respectively, and to generate the final zero-value flag signal, the first one-value flag signal, and the second one-value flag signal. By skipping one or more operations more frequently when the accelerating device is used in a binarized neural network (BNN), the accelerating device may reduce power consumption compared to when used in other types of neural networks.

In an embodiment, the PE includes a controller configured to skip a first read operation of a value of the first converted input signal from a first internal memory and a second read operation of a value of the second converted input signal from a second internal memory when the final zero-value flag signal has the first value. The controller further skips the first read operation or the second read operation when the first one-value flag signal, or the second one-value flag signal, or both have the first value, and the final zero-value flag signal has a second value. By skipping the first read operation, or the second read operation, or both, the number of times for accessing the first internal memory, or the second internal memory, or both using one or more signals (e.g., a chip enable signal, an address signal) may be decreased, thereby reducing power consumption.

A detailed description of embodiments is provided below along with accompanying figures. The scope of this disclosure is limited only by the claims and encompasses numerous alternatives, modifications and equivalents. Although steps of various processes are presented in a given order, embodiments are not necessarily limited to being performed in the listed order. In some embodiments, certain operations may be performed simultaneously, in an order other than the described order, or not performed at all.

Numerous specific details are set forth in the following description. These details are provided to promote a thorough understanding of the scope of this disclosure by way of specific examples, and embodiments may be practiced according to the claims without some of these specific details. Accordingly, the specific embodiments of this disclosure are illustrative, and are not intended to be exclusive or limiting. For the purpose of clarity, technical material that is known in the technical fields related to this disclosure has not been described in detail so that the disclosure is not unnecessarily obscured.

FIG. 1 illustrates a processing system 100 and a host 102 according to an embodiment. The processing system 100 includes a high-speed interface 120, a first memory 130, a memory interface 140, a bus interface 150, a second memory 160, and a neural network accelerating device (NNAD) 110.

The high-speed interface 120 communicates with the host 102. In an embodiment, the high-speed interface 120 is implemented using one of a peripheral component interconnect express (PCIe) protocol, an Advanced Technology Attachment (ATA) protocol, a Serial ATA (SATA) protocol, a Parallel ATA (PATA) protocol, a Small Computer Small Interface (SCSI) protocol, a serial Attached SCSI (SAS) protocol, a Universal Serial Bus (USB) protocol, a Multi-Media Card (MMC) protocol, an Enhanced Small Disk Interface (ESDI) protocol, and an Integrated Drive Electronics (IDE) protocol.

The bus interface 150 interfaces with the high-speed interface 120, the second memory 160, the NNAD 110, and the memory interface 140. The memory interface 140 interfaces with the first memory 130.

The first memory 130 stores data transferred from the host 102 or the NNAD 110. In an embodiment, the first memory 130 is dynamic random access memory (DRAM). However, embodiments of the present disclosure are not limited thereto.

The second memory 160 stores data to be transferred to the NNAD 110. In an embodiment, the second memory 160 is static random access memory (SRAM). However, embodiments of the present disclosure are not limited thereto, and the second memory 160 may be a type other than SRAM or DRAM, e.g., a next generation memory such as MRAM, F-RAM, RRAM, or the like.

The second memory 160 provides input signals IS to the NNAD 110 in response to a request signal from the host 102. For example, the request signal may be transferred from the host 102 to the second memory 160 through the high-speed interface 120 and the bus interface 150. In addition, the request signal may be transferred from the host 102 to the first memory 130 through the high-speed interface 120, the bus interface 150, and the memory interface 140, and then transferred from the first memory 130 to the second memory 160 through the memory interface 140 and the bus interface 150.

The NNAD 110 receives the input signals IS, performs one or more given operations on the input signals IS, and provides output values to the host 102 through the bus interface 150 and the high-speed interface 120 or to the first memory 130 through the memory interface 140. In an embodiment, the NNAD 210 includes a processing elements (PE) cluster (or a PE array).

FIG. 2 illustrates a NNAD 210 suitable for use as the NNAD 110 in FIG. 1 according to an embodiment. The NNAD 210 includes a signal detector 230, a PE cluster 250, and an output feature generator 270.

The signal detector 230 converts one or more input signals IS into one or more converted input signals CIS, respectively, and generates one or more flag signals FS each indicating that one or more of the converted input signals CIS have a specific value (e.g., 0 or 1). The signal detector 230 provides the converted input signals CIS and the flag signals FS to the PE cluster 250.

The PE cluster 250 processes the converted input signals CIS based on one or more of the flag signals FS. In an embodiment, the PE cluster 250 may perform a first arithmetic operation (e.g. a multiplication operation) on the converted input signals CIS and a second arithmetic operation (e.g., an addition operation) on a result of the first arithmetic operation and a result of a previous addition operation, or skip the first arithmetic operation, or skip the first arithmetic operation and the second arithmetic operation, based on one or more of the flag signals FS. For example, the PE cluster 250 may include a plurality of processing elements (PEs) that performs MAC operations in parallel, and each of the PEs may include an operation unit and one or more internal memories (e.g., a scratch pad memory, a register file).

The output feature generator 270 receives one or more output signals OS from the PE cluster 250, applies an activation function to values of the output signals OS to convert the values to non-linear values, performs pooling (e.g., max-pooling) on the non-linear values, and transfers the pooled values to a memory (e.g., the first memory 130 or the second memory 160 in FIG. 1), or a host (e.g., the host 102 in FIG. 1), or both.

FIG. 3 illustrates a signal detector 330 having a signal converter 312 and a flag generating circuit 320 according to an embodiment of the present disclosure.

The signal converter 312 receives one or more input signals IS, and generates one or more converted input signals CIS in response to the received input signals IS. In an embodiment, the input signals IS include a first input signal and a second input signal, and the signal converter 312 converts the first input signal and the second input signal into a first converted input signal and a second converted input signal, respectively. The signal converter 312 provides the converted input signals CIS to the flag generating circuit 320 and a PE cluster 350.

The flag generating circuit 320 generates one or more flag signals FS in response to the converted input signals CIS, and provides the flag signals FS to the PE cluster 350. For example, the flag signals FS include a zero-value flag signal indicating whether either the first converted input signal, or the second converted input signal, or both have a value of 0. The flag signals FS further includes a first one-value flag signal indicating whether the first converted input signal has a value of 1, and a second one-value flag signal indicating whether the second converted input signal has the value of 1.

Figures 4, 5:
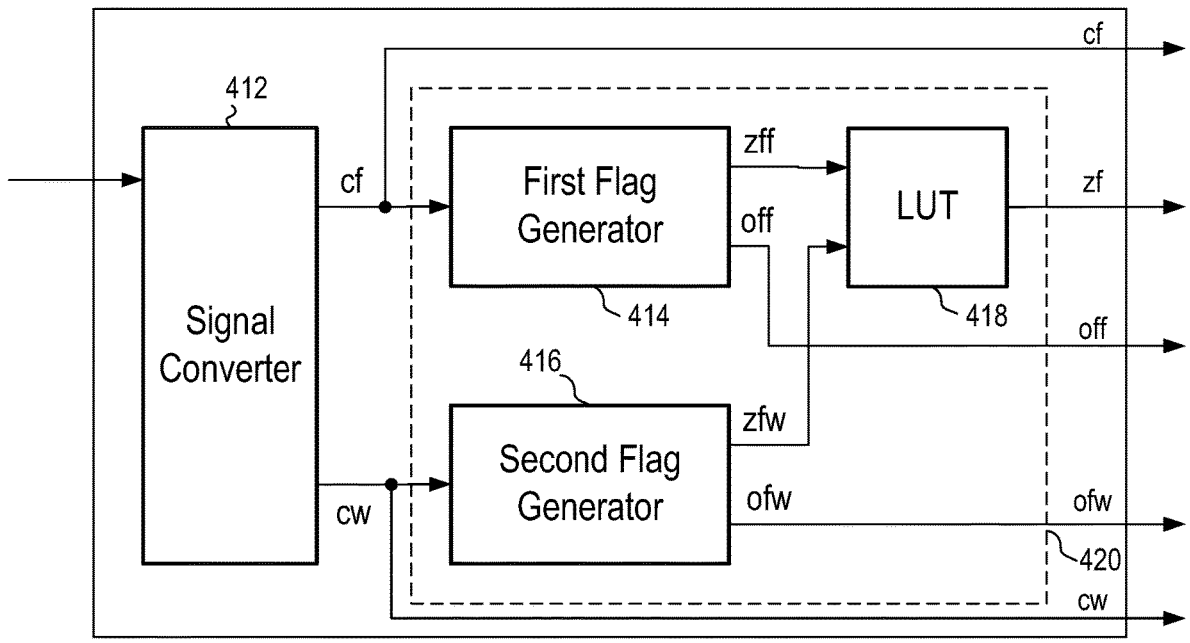
FIG. 4 illustrates a signal detector according to an embodiment of the present disclosure.
FIG. 5 illustrates values of a first input signal, a second input signal, a first converted input signal, a second converted input signal, a first zero-value flag signal, a second zero-value flag signal, a final zero-value signal, a first one-value flag signal, and a second one-value flag signal, according to an embodiment.

FIG. 4 illustrates a signal detector 430 having a signal converter 412 and a flag generating circuit 420. The flag generating circuit 420 includes a first flag generator 414, a second flag generator 416, and a lookup table (LUT) 418, according to an embodiment of the present disclosure. An operation of the signal detector 430 will be described below in more detail with reference to FIG. 5. FIG. 5 illustrates values of a first input signal Feature, a second input signal Weight, a first converted input signal cf, a second converted input signal cw, a first zero-value flag signal zff, a second zero-value flag signal zfw, a final zero-value signal zf, a first one-value flag signal off, and a second one-value flag signal ofw, according to an embodiment.

The signal converter 412 receives a first input signal Feature and a second input signal Weight, and generates a first converted input signal cf and a second converted input signal cw in response to the first and second input signals Feature and Weight. Under a first condition when the first input signal Feature, or the second input signal Weight, or both, have a zero value, the signal converter 412 generates the first and second converted input signals cf and cw that have the same values as the first and second input signals Feature and Weight, respectively. For example, referring to FIG. 5, when the first and second input signals Feature and Weight have values of (0, −1), (−1, 0), (0, 0), (1, 0), (any other integer, 0), (−(any other integer), 0), (0, 1), (0, any other integer) and (0, −(any other integer)), the first and second converted signals cf and cw have the same values of (0, −1), (−1, 0), (0, 0), (1, 0), (any other integer, 0), (−(any other integer), 0), (0, 1), (0, any other integer) and (0, −(any other integer)), respectively. The value of any other integer indicates an integer value other than 1, 0, and −1.

Under a second condition, the second input signal Weight has a value of −1 or 1. In an embodiment, the first condition has a priority higher than the second condition, and thus the first input signal Features does not have the value of 0 under the second condition. When the second input signal Weight has a value of −1, the signal converter 412 generates the first converted input signal cf being an opposite-signed version of the first input signal Feature and the second converted input signal cw has a value of 1. For example, referring to FIG. 5, when the first and second input signals Feature and Weight have values of (−1, −1), (1, −1), (any other integer, −1), (−(any other integer), −1), the first and second converted signals cf and cw have values of (1, 1), (−1, 1), (−(any other integer), 1), ((any other integer), 1), respectively. When the second input signal Weight has a value of 1, the signal converter 412 generates the first converted input signal cf having the same value as the first input signal Feature and the second converted input signal cw having a value of 1. For example, referring to FIG. 5, when the first and second input signals Feature and Weight have values (−1, 1), (1, 1), (any other integer, 1) and (−(any other integer), 1), the first and second converted signals cf and cw have values of (−1, 1), (1, 1), (any other integer, 1) and (−(any other integer), 1), respectively.

Under the second condition, the second converted input signal cw has a value of 1. Thus, when the value is stored in a specific memory (e.g., a scratch pad memory 760-2 in FIG. 7) of a PE (e.g., a PE 760-1 in FIG. 7) that requires generating one or more signals (e.g., a chip enable signal, an address signal) for accessing the memory and information on the value (i.e., 1) of the second converted input signal cw can be known otherwise, the PE may skip a read operation from the memory to reduce power consumption.

Under the second condition, the second converted input signal cw has a value of 1 regardless of whether the second input signal Weight has a value of 1 or −1. In an embodiment, a binarized neural network (BNN) may use −1/1 or −1/0/1 as values for the second input signal Weight. When a neural network accelerating device (e.g., the NNAD 210 in FIG. 2) including the PE cluster according to an embodiment of the present disclosure used in the BNN, such a NNAD may skip one or more operations (e.g., a read operation, a multiplication operation) in response to the values of −1 and 1 for the second input signal Weight. As a result, the NNAD can reduce power consumption when it is used in the BNN compared to when used in other types of neural networks.

Under a third condition, the first input signal Feature has a value of −1 or 1. In an embodiment, the first condition has a priority higher than the second condition and the second condition has a priority higher than the third condition, and thus the second input signal Weight has a value other than 0, 1, and −1 under the third condition. When the first input signal Feature has a value of −1, the signal converter 412 generates the first converted input signal cf having a value of 1 and the second converted input signal cw being an opposite-signed version of the second input signal Weight. For example, referring to FIG. 5, when the first and second input signals Feature and Weight have values of (−1, any other integer) and (−1, −(any other integer)), the first and second converted signals cf and cw have values of (1, −(any other integer)) and (1, (any other integer)), respectively. When the first input signal Feature has a value of 1, the signal converter 412 generates the first converted input signal cf having the value of 1 and the second converted input signal cw having the same value as the second input signal Weight. For example, referring to FIG. 5, when the first and second input signals Feature and Weight have values of (1, any other integer) and (1, −(any other integer)), the first and second converted signals cf and cw have values of (1, any other integer) and (1, −(any other integer)), respectively.

Under a fourth condition, each of the first input signal Feature and the second input signal Weight has any other integer or −(any other integer), and the signal converter 412 generates the first and second converted input signals cf and cw that have the same values as the first and second input signals Feature and Weight. For example, referring to FIG. 5, when the first and second input signals Feature and Weight have values of (any other integer, any other integer), (−(any other integer), any other integer), (any other integer, −(any other integer)), and (−(any other integer), −(any other integer)), the first and second converted signals cf and cw have values of (any other integer, any other integer), (−(any other integer), any other integer), (any other integer, −(any other integer)), and (−(any other integer), −(any other integer)), respectively.

In the embodiment shown in FIG. 5, priorities are given in the order of the first, second, third, and fourth conditions. For example, when a pair of values of the first and second input signals Feature and Weight satisfies two or more of the first, second, third, and fourth conditions, the signal converter 412 generates the first and second converted input signals cf and cw according to the condition having the highest priority. However, embodiments of the present disclosure are not limited thereto.

The signal converter 412 provides the generated first converted input signal cf to the first flag generator 414 and a PE cluster (e.g., the PE cluster 250 in FIG. 2). The signal converter 412 provides the generated second converted input signal cw to the second flag generator 416 and the PE cluster.

The first flag generator 414 receives the first converted input signal cf, and generates a first zero-value flag signal zff and a first one-value flag signal off in response to the first converted input signal cf. In an embodiment, the first flag generator 414 generates the first zero-value flag signal zff having a first value (e.g., a logic high value) and the first one-value flag signal off having a second value (e.g., a logic low value) when the first converted input signal cf has a value of 0. In addition, the first flag generator 414 generates the first zero-value flag signal zff having the second value and the first one-value flag signal off having the first value or the second value when the first converted input signal cf has a value other than 0. For example, the first flag generator 414 generates the first zero-value flag signal zff having the second value and the first one-value flag signal off having the first value when the first converted input signal cf has a value of 1. The first flag generator 414 may generate the first zero-value flag signal zff having the second value and the first one-value flag signal off having the second value, when the first converted input signal cf has values other than 0 and 1. In the embodiment shown in FIG. 5, the first value is 1 and the second value is 0. However, embodiments of the present disclosure are not limited thereto.

The second flag generator 416 receives the second converted input signal cw, and generates a second zero-value flag signal zfw and a second one-value flag signal ofw in response to the second converted input signal cw. In an embodiment, the second flag generator 416 operates similarly to the first flag generator 414 (asserting the second zero-value flag signal zfw to indicate that the second converted input signal cw has a value of zero and asserting the second one-value flag signal ofw to indicate that the second converted input signal cw has a value of one) so a detailed description thereof is omitted in the interest of brevity.

The LUT 418 generates a third zero-value flag signal (or a final zero-value flag signal) zf in response to the first and second zero-value flag signals zff and zfw, and provides the third zero-value flag signal zf to the PE cluster. In an embodiment, the third zero-value flag signal zf is the result of a logical OR operation on the first and second zero-value flag signals zff and zfw. For example, referring to FIG. 5, when the first zero-value flag signal zff, or the second zero-value flag signal zfw, or both have the value of 1, the LUT 418 generates the third zero-value flag signal zf having a first value. Otherwise, the LUT 418 generates the third zero-value flag signal zf having a second value. In the embodiment shown in FIG. 5, the first value is 1 and the second value is 0. However, embodiments of the present disclosure are not limited thereto.

Figure 6:
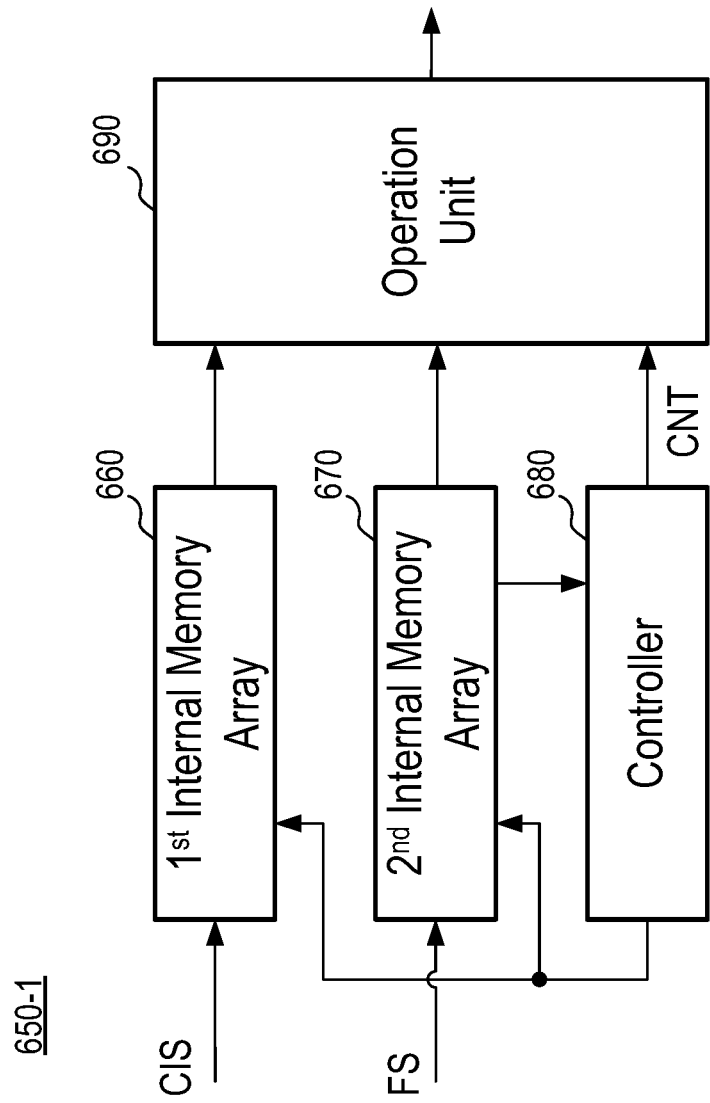
FIG. 6 illustrates a PE according to an embodiment of the present disclosure.

FIG. 6 illustrates a processing element (PE) 650-1 included in a PE cluster suitable for use as the PE cluster 350 in FIG. 3 according to an embodiment of the present disclosure. The PE 650-1 includes a first internal memory array 660, a second internal memory array 670, a controller (e.g., a PE controller) 680, and an operation unit 690.

The first internal memory array 660 stores values of converted input signals CIS. In an embodiment, the first internal memory array 660 includes a plurality of memories, each of which is a first type of memory and requires generation of one or more signals (e.g., a chip enable signal, an address signal) to access data stored therein. For example, the first memory array 660 may include a plurality of scratch pad memories.

The second internal memory array 670 stores values of flag signals FS. In an embodiment, the second internal memory array 670 includes a plurality of memories, each of which is a second type of memory that is different from the first type of memory. For example, the second internal memory array 670 may include a plurality of register files (or registers).

The controller 680 controls one or more read operations on the plurality of memories of the first internal memory array 660 based on one or more values stored in the second internal memory array 670. The PE controller 680 further controls one or more arithmetic operations of the operation unit 690 based the values stored in the second internal memory array 670.

Figure 7:
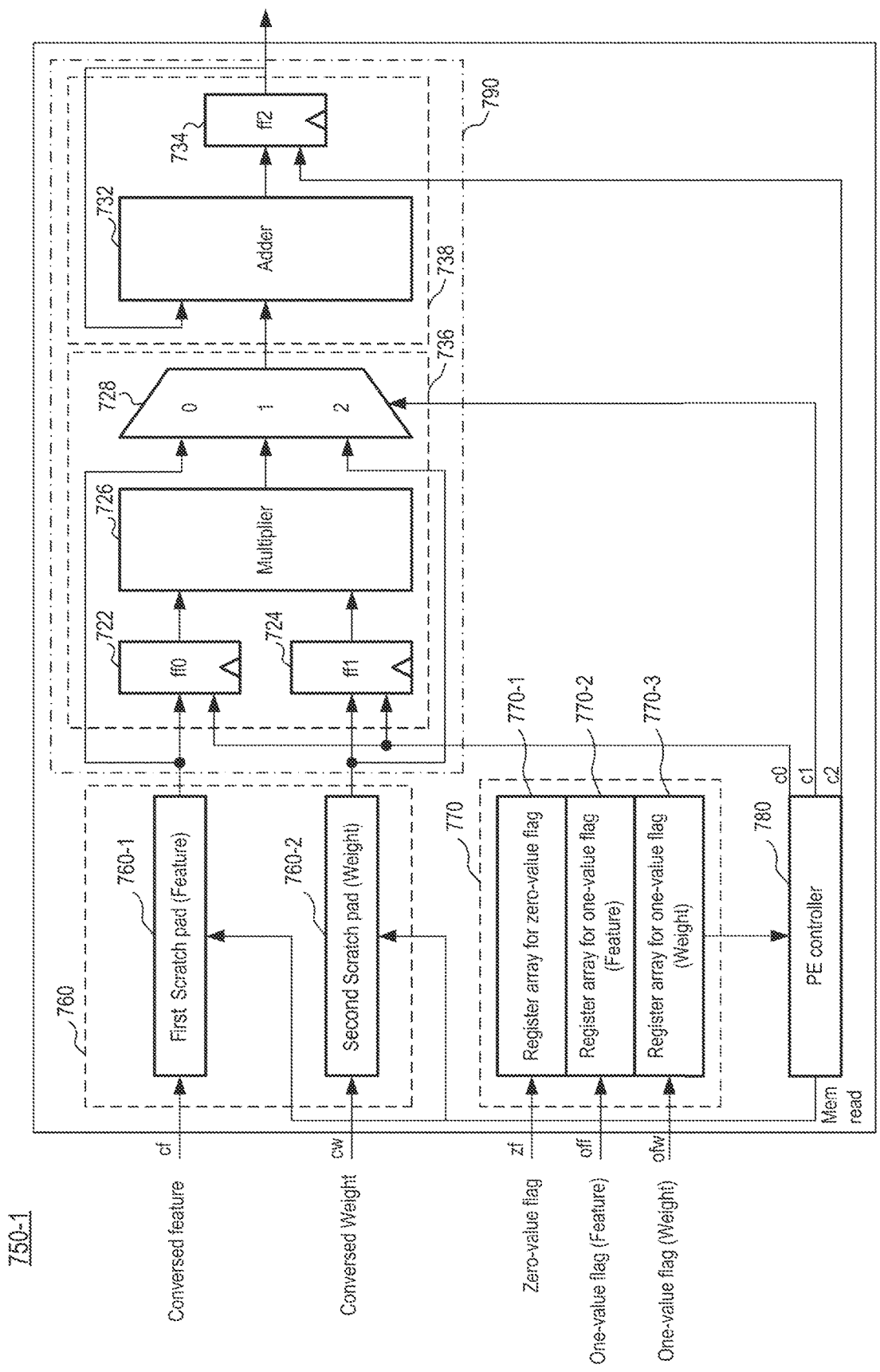
FIG. 7 illustrates a PE according to an embodiment of the present disclosure.

FIG. 7 illustrates a processing element (PE) 750-1 suitable for use as the PE 650-1 in FIG. 6 according to an embodiment of the present disclosure. The PE 750-1 includes a first internal memory array 760, a second internal memory array 770, a controller (e.g., a PE controller) 780, and an operation unit (or an operation circuit) 790. In the embodiment shown in FIG. 7, the PE 750-1 is configured for performing a convolutional operation. However, embodiments of the present disclosure are not limited thereto.

The first internal memory array 760 includes a first scratch pad memory 760-1 and a second scratch pad memory 760-2. The first scratch pad memory 760-1 stores a value of a first converted input signal cf, and the second scratch pad memory 760-2 stores a value of a second converted input signal cw. Each of the first and second scratch pad memories 760-1 and 760-2 may serve as temporary storage to hold data for rapid retrieval in the PE 750-1. As a result, power consumption and a latency to transfer data stored in each of the first and second scratch pad memories 760-1 and 760-2 may be reduced compared to those when data is transferred from an external memory (e.g., the first memory 130 in FIG. 1). In an embodiment, each of the first and second scratch pad memories 760-1 and 760-2 is static random access memory (SRAM), but embodiments of the present disclosure are not limited thereto. One or more signals (e.g., a chip enable signal, an address signal) may be applied to access data stored in each of the first and second scratch pad memories 760-1 and 760-2.

The second internal memory array 770 includes a first register array 770-1, a second register array 770-2, and a third register array 770-3. The first register array 770-1 stores a value of a zero-value flag signal zf (e.g., the third zero-value signal zf in FIG. 4), the second register array 770-2 stores a value of a first one-value flag signal off (e.g., the first one-value flag signal off in FIG. 4), and the third register array 770-3 stores a value of a second one-value flag signal ofw (e.g., the second one-value flag signal ofw in FIG. 4).

The PE controller 780 controls read operations on the first and second scratch pad memories 760-1 and 760-2 based on one or more values stored in the first, second, and third register arrays 770-1 to 770-3. When the PE controller 780 determines that the value of the zero-value flag signal zf stored in the first register array 770-1 is a first value (e.g., 1), the PE controller 780 controls the PE 750-1 to skip a read operation on the first scratch pad memory 760-1 and a read operation on the second scratch pad memory 760-2. For example, referring to FIG. 8, when values of the zero-value flag signal zf, the first one-value flag signal off, and the second one-value flag signal ofw are (1, 0, 0) as indicated in the solid box, the PE controller 780 controls the PE 750-1 to skip the read operation on the first scratch pad memory 760-1 and the read operation on the second scratch pad memory 760-2.

When the PE controller 780 determines that the value of the zero-value flag signal zf stored in the first register array 770-1 is a second value (e.g., 0) and one or both of the values of the first and second one-value flag signals off and ofw are a first value (e.g., 1), the PE controller 780 controls the PE 750-1 to skip either a read operation on the first scratch pad memory 760-1 or a read operation on the second scratch pad memory 760-2. For example, referring to FIG. 8, when values of the zero-value flag signal zf, the first one-value flag signal off, and the second one-value flag signal ofw are (0, 0, 1) as indicated in the dashed box, the PE controller 780 controls the PE 750-1 to skip the read operation on the second scratch pad memory 760-2. In addition, when values of the zero-value flag signal zf, the first one-value flag signal off, and the second one-value flag signal ofw are (0, 1, 0) as indicated in the dashed dotted box, the PE controller 780 controls the PE 750-1 to skip the read operation on the first scratch pad memory 760-1.

As described above, the PE controller 780 may control the PE 750-1 to skip one or both of the read operations on the first and second scratch pad memories 760-1 and 760-2 based on the values stored in the first, second, and third register arrays 770-1 to 770-3. Thus, the number of times for accessing the first scratch pad memory 760-1, the second scratch pad memory 760-2, or both using one or more signals (e.g., a chip enable signal, an address signal) may be decreased, leading to reduced power consumption.

The PE controller 780 further controls a multiplication operation and an addition operation (e.g., an accumulation operation) of the operation unit 790 based on one or more values stored in the first, second, and third register arrays 770-1 to 770-3. The operation unit 790 includes a multiplication unit (or a multiplication circuit) 736 and an addition unit (or an addition circuit) 738. The multiplication unit 736 includes first and second flip-flops (FFs) 722 and 724, a multiplier 726, and a multiplexer (MUX) 728. The addition unit 738 includes an adder 732 and a third FF 734.

In an embodiment, the PE controller 780 may access the first, second, and third register arrays 770-1, 770-2, and 770-3 in the order of given priorities. For example, the PE controller 780 may first access the first register array 770-1 having the highest priority among the register arrays 770-1, 770-2, and 770-3. When the PE controller 780 determines that the value of the zero-value flag signal zf stored in the first register array 770-1 is a first value (e.g., 1), the PE controller 780 generates a first control signal c0 to deactivate the first and second flip flops 722 and 724, a second control signal c1 to control the MUX 728 to keep outputting a previous multiplication result, and a third control signal c2 to deactivate the third flip flop 734.

For example, referring to FIG. 8, when values of the zero-value flag signal zf, the first one-value flag signal off, and the second one-value flag signal ofw are (1, 0, 0) as indicated in the solid box, the PE controller 780 generates the first control signal c0 having a value of 0, the second control signal c1 having a value of 1, and the third control signal c2 having a value of 0. Because the multiplier 726 keeps receiving the previous input values from the first and second FFs 722 and 724 and the adder 732 keeps receiving the previous multiplication result from the MUX 728 and the previous value from the third FF 734, the operation unit 790 may skip the multiplication operation and the addition operation. By skipping the multiplication operation and the addition operation, an occurrence of one or more dynamic currents in the multiplier 726 and the adder 732 is substantially prevented, thereby reducing power consumption of the operation unit 790.

When the PE controller 780 determines that the value of the zero-value flag signal zf stored in the first register array 770-1 is a second value (e.g., 0), the PE controller 780 may access the second register array 770-2, or the third register array 770-3, or both. When the PE controller 780 determines that the value of the zero-value flag signal zf stored in the first register array 770-1 is a second value (e.g., 0) and one or both of the values of the first and second one-value flag signals off and ofw are a first value (e.g., 1), the PE controller 780 generates the first control signal c0 to deactivate the first and second flip flops 722 and 724, the second control signal c1 to control the MUX 728 bypass data from the first or second scratch pad memory 760-1 or 760-2 to the adder 732, and the third control signal c3 to enable the third FF 734. In particular, when the value of the zero-value flag signal zf is 0 and the second one-value flag signal ofw is 1, then the second control signal c1 controls the MUX 728 to output a Feature value from the first scratch pad memory 760-1 to the adder 732, and when the zero-value flag signal zf is 0, and the first one-value flag signal off is 1, and the second one-value flag signal ofw is 0, the second control signal c1 controls the MUX 728 to output a Weight value from the second scratch pad memory 760-2 to the adder 732. In this way, the PE 750 avoids incurring the power cost of using the multiplier 760 to perform a simple multiplication by 1.

For example, referring to FIG. 8, when values of the zero-value flag signal zf, the first one-value flag signal off, and the second one-value flag signal ofw are (0, 0, 1) as indicated in the , the PE controller 780 generates the first control signal c0 having a value of 0, the second control signal c1 having a value of 0, and the third control signal c2 having a value of 1. In another example, when values of the zero-value flag signal zf, the first one-value flag signal off, and the second one-value flag signal ofw are (0, 1, 0) as indicated in the dashed dotted box, the PE controller 780 generates the first control signal c0 having a value of 0, the second control signal c1 having a value of 2, and the third control signal c2 having a value of 1. In both examples, because the multiplier 726 keeps receiving the previous input values from the first and second FFs 722 and 724 whereas the adder 732 receives the current value from the second scratch pad 760-2 and the current value from the third FF 734, the operation unit 790 may skip the multiplication operation but perform the addition operation. By skipping the multiplication operation, an occurrence of one or more dynamic currents in the multiplier 726 is substantially prevented, thereby reducing power consumption of the operation unit 790.

In the embodiment shown in FIG. 7, the first and second FFs 722 and 724 are deactivated when the first control signal c0 is de-asserted to have a value of 0, and thus the multiplication unit 736 skips the multiplication operation on the first and second converted input signals cf and cw and outputs the previous multiplication result. However, embodiments of the present disclosure are not limited thereto. For example, the first and second FFs 722 and 724 are deactivated when the first control signal (or a multiplication input retention signal) c0 is asserted to have a value of 1.

In the embodiment shown in FIG. 7, the third FF 734 is deactivated when the third control signal c2 is de-asserted to have a value of 0, and thus the addition unit 738 outputs the previous addition result. However, embodiments of the present disclosure are not limited thereto. For example, the third FF 734 is deactivated when the third control signal (or an addition output retention signal) c2 is asserted to have a value of 1.

FIG. 9 is a flowchart illustrating a process 900 performed by a neural network accelerating device (NNAD) according to an embodiment. In an embodiment, the NNAD includes a signal detector (e.g., the signal detector 430 in FIG. 4) and a PE cluster (e.g., the PE cluster 350 in FIG. 3). The signal detector includes a signal converter (e.g., the signal converter 412 of FIG. 4) and a flag generating circuit (e.g., the flag generating circuit 420 in FIG. 4). The PE cluster includes a plurality of PEs (e.g., the PE 750-1 in FIG. 7) each having a PE controller (e.g., the PE controller 780 in FIG. 7) and an operation unit (e.g., the operation unit 790 in FIG. 7).

At S910, the signal detector receives a first input signal (e.g., the first input signal Feature in FIG. 4) and a second input signal (e.g., the second input signal Weight in FIG. 4).

At S930, the signal converter converts the first input signal and the second input signal into a first converted input signal (e.g., the first converted input signal cf in FIG. 4) and a second converted input signal (e.g., the second converted input signal cw in FIG. 4). An operation of the signal converter will be described below in more detail with reference to FIG. 10.

At S950, the flag generating circuit generates one or more flag signals in response to the first converted input signal and the second converted input signal, and provides the flag signals to the PE cluster. An operation of the flag generating circuit will be described below in more detail with reference to FIG. 11.

At S970, the PE controller controls one or more read operations on a plurality of memories in a first internal memory array (e.g., the first internal memory array 760 in FIG. 7) and one or more operations of the operation unit in response to the flag signals. An operation of the PE controller will be described below in more detail with reference to FIG. 12.

Figure 10:
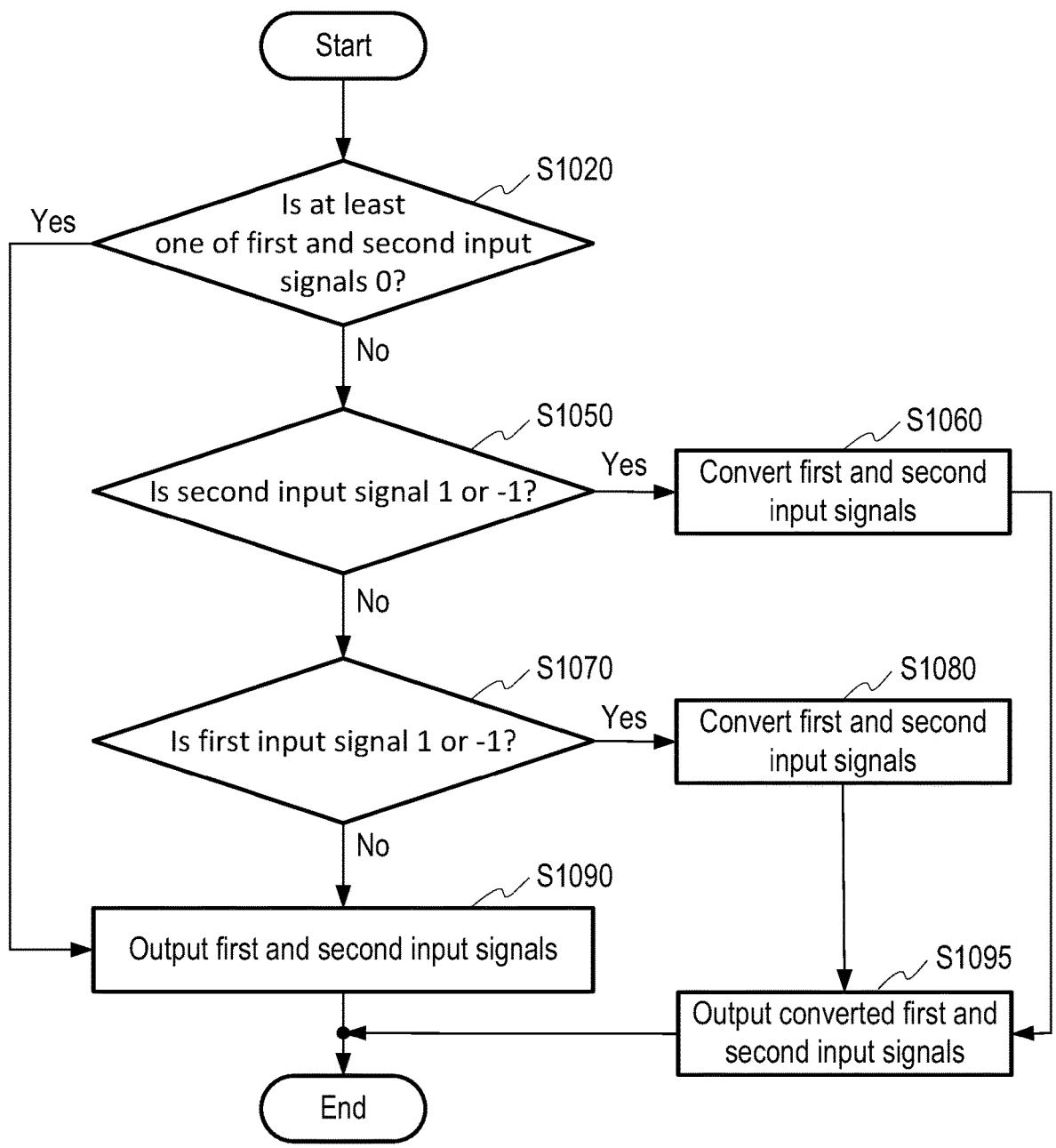
FIG. 10 is a flowchart illustrating a process of converting a first input signal and a second input signal into a first converted input signal and a second converted input signal, respectively, according to an embodiment.

FIG. 10 is a flowchart illustrating a process 1030 of converting a first input signal (e.g., the first input signal Feature in FIG. 4) and a second input signal (e.g., the second input signal Weight in FIG. 4) into a first converted input signal (e.g., the first converted input signal cf in FIG. 4) and a second converted input signal (e.g., the second converted input signal cw in FIG. 4), respectively, according to an embodiment.

At S1020, a signal converter (e.g., the signal converter 412 of FIG. 4) determines whether the first input signal, or the second input signal, or both, have a value of 0. If the signal converter determines that the first input signal, or the second input signal, or both, have the value of 0, the process 1030 proceeds to S1090. 50, the signal converter determines whether the second input signal has a value of −1 or 1. If the signal converter determines that the second input signal has a value of −1 or 1, the process S1030 proceeds to S1060; otherwise, at S1050 the process 1030 proceeds to S1070.

At S1060, when the second input signal has a value of −1, the signal converter generates the first converted input signal being an opposite-signed version of the first input signal and the second converted input signal having a value of 1. When the second input signal has a value of 1, the signal converter generates the first converted input signal having the same value as the first input signal and the second converted input signal having the value of 1. As a result, the first converted input signal has the same value as the multiplication result of the value of the first input signal and the value of the second input signal, and the second converted input signal has a value of 1.

At S1070, the signal converter determines whether the first input signal has a value of −1 or 1. If the signal converter determines that the first input signal has a value of −1 or 1, the process 1030 proceeds to S1080; otherwise, at S1070 the process 1030 proceeds to S1090.

At S1080, when the first input signal has a value of −1, the signal converter generates the first converted input signal having a value of 1 and the second converted input signal being an opposite-signed version of the second input signal. When the first input signal has a value of 1, the signal converter generates the first converted input signal having the value of 1 and the second converted input signal having the same value as the second input signal. As a result, the first converted input signal has a value of 1 and the second converted input signal has the same value as the multiplication result of the value of the first input signal and the value of the second input signal.

At S1090, the signal converter outputs the value of the first input signal and the value of the second input signal as the value of the first converted input signal and the value of the second converted input signal, respectively.

At S1095, the signal converter outputs the values of the first converted input signal and the value of the second converted input signal produced at S1060 or S1080.

FIG. 11 is a flowchart illustrating a process 1150 of generating one or more flag signals according to an embodiment. In an embodiment, these flag signals include a first zero-value flag signal (e.g., the first zero-value flag signal zff in FIG. 4), a second zero-value flag signal (e.g., the second zero-value flag signal zfw in FIG. 4), a third zero-value flag signal (e.g., the third zero-value flag signal zf in FIG. 4), a first one-value flag signal (e.g., the first one-value flag signal off in FIG. 4), and a second one-value flag signal (e.g., the second one-value flag signal ofw in FIG. 4).

At S1110, a first flag generator (e.g., the first flag generator 414 in FIG. 4) receives a first converted input signal (e.g., the first converted input signal cf in FIG. 4), and a second flag generator (e.g., the second flag generator 416 in FIG. 4) receives a second converted input signal (e.g., the second converted input signal cw in FIG. 4). The first and second converted input signals may be the outputs of the process 1030 of FIG. 10.

At S1130, the first flag generator generates the first zero-value flag signal and the first one-value flag signal in response to the first converted input signal. In an embodiment, the first flag generator generates the first zero-value flag signal having a first value (e.g., 1) and the first one-value flag signal having a second value (e.g., 0) when the first converted input signal has a value of 0; generates the first zero-value flag signal having the second value and the first one-value flag signal having the first value when the first converted input signal has a value of 1; and generates the first zero-value flag signal having the second value and the first one-value flag signal having the second value otherwise. The second flag generator generates the second zero-value flag signal and the second one-value flag signal in response to the second converted input signal. In an embodiment, the second flag generator generates the second zero-value flag signal having a first value (e.g., 1) and the second one-value flag signal having a second value (e.g., 0) when the second converted input signal has a value of 0; generates the second zero-value flag signal having the second value and the second one-value flag signal having the first value when the second converted input signal has a value of 1; and generates the second zero-value flag signal having the second value and the second one-value flag signal having the second value otherwise.

At S1150, the first flag generator provides the first zero-value flag signal to a lookup table (e.g., the LUT 418 in FIG. 4) and provides the first one-value flag signal to a PE cluster (e.g., the PE cluster 350 in FIG. 3). The second flag generator provides the second zero-value flag signal to the LUT and provides the second one-value flag signal to the PE cluster.

At S1170, the LUT generates the third zero-value flag signal (or a final zero-value signal) in response to the first zero-value flag signal and the second zero-value flag signal, and provides the third zero-value flag signal to the PE cluster. In an embodiment, the third zero-value flag signal is the result of a logical OR operation on the first zero-value flag signal and the second zero-value flag signal.

FIG. 12 is a flowchart illustrating a process 1270 of controlling one or more read operations on a plurality of memories in a first internal memory array (e.g., the first internal memory array 760 in FIG. 7) and one or more operations of an operation unit (e.g., the operation unit 790 in FIG. 7), according to an embodiment.

At S1210, a PE (e.g., the PE 750 in FIG. 7) receives converted input signals and flag signals, and stores the converted input signals in the first internal memory array and the flag signals in a second internal memory array (e.g., the second internal memory array 770 in FIG. 7). In an embodiment, the first internal memory array includes a first scratch pad memory (e.g., the first scratch pad memory 760-1 in FIG. 7) and a second scratch pad memory (e.g., the second scratch pad memory 760-2 in FIG. 7). The first scratch pad memory stores a value of a first converted input signal (e.g., the first converted input signal cf in FIG. 7), and the second scratch pad memory stores a value of a second converted input signal (e.g., the second converted input signal cw in FIG. 7). The second internal memory array includes a first register array (e.g., the first register array 770-1 in FIG. 7), a second register array (e.g., the second register array 770-2 in FIG. 7), and a third register array (e.g., the third register array 770-3 in FIG. 7). The first register array stores a value of a final zero-value flag signal (e.g., the third zero-value flag signal zf in FIG. 7), the second register array stores a value of a first one-value flag signal (e.g., the first one-value flag signal off in FIG. 7), and the third register array stores a value of a second one-value flag signal (e.g., the second one-value flag signal ofw in FIG. 7).

At S1220, a PE controller (e.g., the PE controller 780 in FIG. 7) of the PE determines whether a value of the zero-value flag signal stored in the first register array is a first value (e.g., 1). When the PE controller determines that the value of the zero-value flag signal stored in the first register array is the first value, the process 1270 proceeds to S1230; otherwise, at S1220 the process 1270 proceeds to S1240.

At S1230, the PE controller controls to skip a first read operation on the first scratch pad memory and a second read operation on the second scratch pad memory. The PE controller causes the operation unit to skip a multiplication operation (e.g., the multiplication operation performed by the multiplication unit 736 in FIG. 7) and an addition operation (e.g., the addition operation performed by the addition unit 738 in FIG. 7).

At S1240, the PE controller determines whether a value of the first one-value flag signal, or a value of the second one-value flag signal, or both, are a first value (e.g., 1). If the PE controller determines that the value of the first one-value flag signal, or the value of the second one-value flag signal, or both, are the first value, the process 1270 proceeds to S1250; otherwise, at S1240 the process 1270 proceeds to S1260.

At S1250, the PE controller controls to skip either a first read operation on the first scratch pad memory or a second read operation on the second scratch pad memory. The PE controller further causes the operation unit to skip a multiplication operation and to perform an addition operation. For example, in an embodiment, when the first one-value flag signal is the first value, the PE controller skips reading the first scratch pad memory, reads the second scratch pad memory, and performs the add operation using the value read from the second scratch pad memory; otherwise, the PE controller skips reading the second scratch pad memory; reads the first scratch pad memory, and performs the add operation using the value read from the first scratch pad memory.

At S1260, the PE controller controls to perform the first read operation on the first scratch pad memory and the second read operation on the second scratch pad memory. The PE controller further causes the operation unit to perform the multiplication operation using the values read from the first and second scratch pad memories and to perform the addition operation using the result of the multiplication operation.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. An accelerating device, comprising:
 a signal detector configured to convert a first input signal and a second input signal into a first converted input signal and a second converted input signal, respectively, and to generate a final zero-value flag signal, a first one-value flag signal, and a second one-value flag signal; and a processing element (PE) configured to process the first converted input signal and the second converted input signal based on the final zero-value flag signal, the first one-value flag signal, and the second one-value flag signal, the PE skipping a first arithmetic operation and a second arithmetic operation when the final zero-value flag signal has a first value, the first value of the final zero-value flag signal indicating that the first input signal, or the second input signal, or both have a value of 0.

2. The device of claim 1, wherein the PE skips the first arithmetic operation and performs the second arithmetic operation when the first one-value flag signal, or the second one-value flag signal, or both have the first value, and the final zero-value flag signal has a second value, the first value of the first one-value flag signal indicating that the first input signal has a value of −1 or 1, the first value of the second one-value flag signal indicating that the second input signal has a value of −1 or 1.

3. The device of claim 1, wherein the PE includes:
a first internal memory configured to store a value of the first converted input signal, the first internal memory being a first type;
a second internal memory configured to store a value of the second converted input signal, the second internal memory being the first type;
a third internal memory configured to store a value of the final zero-value flag signal, the third internal memory being a second type that is different from the first type; and
a controller configured to read the value of the final zero-value flag signal from the third internal memory, and to skip a first read operation of the value of the first converted input signal from the first internal memory and a second read operation of the value of the second converted input signal from the second internal memory when the final zero-value flag signal has the first value.

4. The device of claim 3, wherein the PE further includes:
a fourth internal memory configured to store a value of the first one-value flag signal, the fourth internal memory being the second type; and
a fifth internal memory configured to store a value of the second one-value flag signal, the fifth internal memory being the second type,
wherein the controller reads the value of the first one-value flag signal, or the value of the second one-value flag signal, or both, and
wherein the controller skips the first read operation or the second read operation when the first one-value flag signal, or the second one-value flag signal, or both have the first value, and the final zero-value flag signal has a second value.

5. The device of claim 4, wherein the controller reads the value of the second one-value flag signal from the fifth internal memory, and
wherein the controller skips the second read operation when the value of the second one-value flag signal has the first value.

6. The device of claim 4, wherein each of the first internal memory and the second internal memory is a scratch pad memory, and each of the third internal memory, the fourth internal memory, and the fifth internal memory is a register.

7. The device of claim 4, wherein the controller generates a first control signal, a second control signal, and a third control signal based on the value of the final zero-value flag signal, the value of the first one-value flag signal, and the value of the second one-value flag signal, and
wherein the first arithmetic operation is a multiplication operation and the second arithmetic operation is an addition operation, the PE further including:
a multiplication circuit configured to perform the multiplication operation on the value of the first converted input signal and the value of the second converted input signal in response to the first control signal and the second control signal; and
an addition circuit configured to perform the addition operation on a multiplication result from the multiplication circuit and a previous addition result in response to the third control signal.

8. The device of claim 7, wherein the multiplication circuit includes:
a first flip-flop (FF) coupled to the first internal memory and configured to be activated in response to the first control signal;
a second FF coupled to the second internal memory and configured to be activated in response to the first control signal;
a multiplier configured to perform the multiplication operation on an output signal from the first FF and an output signal from the second FF; and
a multiplexer (MUX) configured to select one of the value of the first converted input signal, the value of the second converted input signal, and an output result from the multiplier as the multiplication result in response to the second control signal and to provide the multiplication result to the addition circuit.

9. The device of claim 8, wherein the addition circuit includes:
an adder configured to add the multiplication result and the previous addition result to output a current addition result; and
a third FF coupled to the adder and configured to be activated in response to the third control signal.

10. The device of claim 1, wherein the signal detector generates the first converted input signal having the same value as the first input signal and the second converted input signal having the same value as the second input signal when the first input signal, or the second input signal, or both have the value of 0.

11. The device of claim 10, wherein the signal detector generates the first converted input signal that is an opposite-signed version of the first input signal and the second converted input signal that has a value of 1 when the second input signal has the value of 1 or a value of −1 and the first input signal has a value other than the value of 0.

12. The device of claim 11, wherein the signal detector generates the second converted input signal that is an opposite-signed version of the second input signal and generates the first converted input signal that has the value of 1 when the first input signal has the value of 1 or the value of −1 and the second input signal has a value other than the values of 0, 1, and −1.

13. The device of claim 1, wherein the signal detector includes:
a first flag generator configured to generate a first zero-value flag signal and the first one-value flag signal in response to the first converted input signal;

a second flag generator configured to generate a second zero-value flag signal and the second one-value flag signal in response to the second converted input signal; and a lookup table configured to generate the final zero-value flag signal in response to the first zero-value flag signal and the second zero-value flag signal.

14. The device of claim 13, wherein the final zero-value flag signal is the result of a logical OR operation on the first zero-value flag signal and the second zero-value flag signal.

15. A method for controlling an accelerating device, the method comprising:
converting a first input signal and a second input signal into a first converted input signal and a second converted input signal, respectively;
generating a final zero-value flag signal, a first one-value flag signal, and a second one-value flag signal; and
skipping a first arithmetic operation and a second arithmetic operation when the final zero-value flag signal has a first value, the first value of the final zero-value flag signal indicating that the first input signal, or the second input signal, or both have a value of 0.

16. The method of claim 15, further comprising:
skipping the first arithmetic operation and performing the second arithmetic operation when the first one-value flag signal, or the second one-value flag signal, or both have the first value, and the final zero-value flag signal has a second value,
wherein the first value of the first one-value flag signal indicates that the first input signal has a value of −1 or 1, and the first value of the second one-value flag signal indicates that the second input signal has a value of −1 or 1.

17. The method of claim 15, further comprising:
storing a value of the first converted input signal in a first internal memory, the first internal memory being a first type;
storing a value of the second converted input signal in a second internal memory, the second internal memory being the first type;
storing a value of the final zero-value flag signal in a third internal memory, the third internal memory being a second type that is different from the first type;
reading the value of the final zero-value flag signal from the third internal memory; and skipping a first read operation of the value of the first converted input signal from the first internal memory and a second read operation of the value of the second converted input signal from the second internal memory when the final zero-value flag signal has the first value.

18. The method of claim 15, further comprising:
generating the first converted input signal having the same value as the first input signal and the second converted input signal having the same value as the second input signal when the first input signal, or the second input signal, or both have the value of 0.

19. A processing system, comprising:
a memory configured to store data and output input signals in response to a request signal from a host;
an accelerating device configured to receive the input signals and perform one or more given arithmetic operations on the input signals, the input signals including a first input signal and a second input signal, the accelerating device including:
a signal detector configured to convert the first input signal and the second input signal into a first converted input signal and a second converted input signal, respectively, and to generate a final zero-value flag signal, a first one-value flag signal, and a second one-value flag signal; and
a processing element (PE) configured to process the first converted input signal and the second converted input signal based on the final zero-value flag signal, the first one-value flag signal, and the second one-value flag signal, and to skip a first arithmetic operation and a second arithmetic operation when the final zero-value flag signal has a first value, the first value of the final zero-value flag signal indicating that the first input signal, or the second input signal, or both have a value of 0.

20. The system of claim 19, wherein the PE skips the first arithmetic operation and performs the second arithmetic operation when the first one-value flag signal, or the second one-value flag signal, or both have the first value, and the final zero-value flag signal has a second value, the first value of the first one-value flag signal indicating that the first input signal has a value of −1 or 1, the first value of the second one-value flag signal indicating that the second input signal has a value of −1 or 1.

* * * * *